(12) United States Patent
Liu et al.

(10) Patent No.: US 9,060,270 B2
(45) Date of Patent: Jun. 16, 2015

(54) METHOD AND DEVICE FOR ESTABLISHING A SECURITY MECHANISM FOR AN AIR INTERFACE LINK

(75) Inventors: Jing Liu, Shanghai (CN); Aiqin Zhang, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 130 days.

(21) Appl. No.: 13/285,321

(22) Filed: Oct. 31, 2011

(65) Prior Publication Data
US 2012/0039472 A1 Feb. 16, 2012

Related U.S. Application Data

(63) Continuation of application No. PCT/CN2009/071614, filed on Apr. 30, 2009.

(51) Int. Cl.
H04L 29/06 (2006.01)
H04W 12/04 (2009.01)

(52) U.S. Cl.
CPC ......... *H04W 12/04* (2013.01); *H04L 2463/061* (2013.01)

(58) Field of Classification Search
USPC ........................................................ 380/270
See application file for complete search history.

(56) References Cited

U.S. PATENT DOCUMENTS

| 2008/0188200 | A1* | 8/2008 | Forsberg | 455/410 |
| 2009/0061878 | A1* | 3/2009 | Fischer | 455/436 |
| 2009/0068986 | A1 | 3/2009 | Wang et al. | |
| 2009/0074189 | A1* | 3/2009 | Ryu et al. | 380/277 |
| 2009/0270099 | A1* | 10/2009 | Gallagher et al. | 455/435.1 |
| 2010/0111308 | A1* | 5/2010 | Forsberg et al. | 380/278 |
| 2010/0260096 | A1* | 10/2010 | Ulupinar et al. | 370/315 |
| 2011/0116629 | A1* | 5/2011 | Forsberg et al. | 380/44 |

FOREIGN PATENT DOCUMENTS

| CN | 101052035 A | 10/2007 |
| CN | 101072092 A | 11/2007 |
| CN | 101292588 A | 10/2008 |
| CN | 101471767 A | 7/2009 |
| CN | 101500229 A | 8/2009 |

(Continued)

OTHER PUBLICATIONS

Arkko, J. and H. Haverinen, "Extensible Authentication Protocol Method for 3rd Generation Authentication and Key Agreement (EAP-AKA)", RFC 4187, Jan. 2006.*

(Continued)

*Primary Examiner* — Vikkram Bali
*Assistant Examiner* — Tracy Mangialaschi
(74) *Attorney, Agent, or Firm* — Slater & Matsil, L.L.P.

(57) ABSTRACT

A method, a device, and a system for establishing a security mechanism for an air interface are provided in embodiments of the present invention. The method includes: performing security processing for a shared key of an access link according to a shared key between a relay node and a mobility management entity; and sending the shared key of the access link after the security processing to the relay node to enable the relay node to obtain the shared key of the access link based on the shared key between the relay node and the mobility management entity. The present invention reduces the possibility at which the air interface link is hacked, thereby improving the security of the air interface link.

12 Claims, 9 Drawing Sheets

(56) References Cited

FOREIGN PATENT DOCUMENTS

| CN | 101500230 A | 8/2009 |
|----|----|----|
| CN | 101534236 A | 9/2009 |
| CN | 101640886 A | 2/2010 |
| CN | 101640887 A | 2/2010 |
| WO | WO 2007/046630 A2 | 4/2007 |
| WO | WO 2009122260 A2 * | 10/2009 |

OTHER PUBLICATIONS

Extended European Search Report mailed Jul. 9, 2012, issued in related European Application No. 09843886.4, Huawei Technologies Co., Ltd. (11 pages).

$3^{rd}$ Generation Partnership Project; Technical Specification Group Services and System Aspects; 3GPP System Architecture Evolution (SAE): Security Architecture (Release 8), 3GPP TS 33.401 v8.2.0 (Dec. 2008) Technical Specification, (54 pages).

3GPP TSG RAN WG3 #64, Type 1 Relay Architecture Consideration, R3-091334, San Francisco, California, May 4-8, 2009, (7 pages).

3GPP TSG RAN WG2 Meeting #65bis, Tdoc R2-092679, Seoul, Korea, Mar. 23-27, 2009, (2 pages).

International Search Report from the Chinese Patent Office for International Application No. PCT/CN2009/071614, mailed Feb. 4, 2010.

Written Opinion of the International Searching Authority for International Application No. PCT/CN2009/071614, mailed Feb. 4, 2010.

* cited by examiner

METHOD AND DEVICE FOR ESTABLISHING A SECURITY MECHANISM FOR AN AIR INTERFACE LINK

CROSS-REFERENCE TO RELATED APPLICATIONS

This application is a continuation of International Application No. PCT/CN2009/071614, filed on Apr. 30, 2009, which is hereby incorporated by reference in its entirety.

FIELD OF THE INVENTION

The present invention relates to a communications field, and in particular, to a method and a device for establishing a security mechanism for an air interface link.

BACKGROUND

Mobile communication is one of the most quickly developed and widely used communication fields. However, as the system coverage scope extends, the user number increases, and service providers provide diversified services, the networks become increasingly complicated. How to ensure security of the network and service information becomes an urgent issue to be solved.

After a relay node (RN) is introduced to the Long Term Evolution (LTE) system, the single-hop air interface link between the user equipment (UE) and the eNodeB (eNB) is segmented into an access link between the UE and the RN and a relay link between the RN and eNB. According to different modes of the security control, the security control may further classify into centralized security control and distributed security control.

Centralized security control indicates that a security association is directly established between the UE and eNB, but the intermediate node RN in the link does not participate in establishment of the security association. At the access network side, all key information related to the UE is stored and maintained only on the UE and eNB. No UE-related key information exists on the RN. Therefore, after the RN is introduced, no impact is made on the security mechanism (including identity authentication and key derivation processes) in the initial network entry process of the UE. The UE uses the traditional access authentication process of the LTE system for network access.

Distributed security control indicates that segments of security association are established between the UE and the RN and between the RN and the eNB respectively. The intermediate node RN in the link needs to save and maintain certain UE-related key information. Therefore, after the RN is introduced, a certain impact is made on the security mechanism in the initial network entry process of the UE. This impact exists in the derivation and distribution processes of the key.

To be compatible with the R8 UE, after the RN is introduced, the derivation hierarchy of the system key cannot be changed. That is, the eNB needs to continue to deliver the received shared key to the access site RN of the UE for the RN to further derive security keys used for the user plane and control plane based on the received shared key. In this way, the shared key between the UE and the eNB is the same as that between the UE and its access site RN so that the eNB can easily deduce or obtain the security keys used for the user plane and control plane in the access link between the UE and RN.

When developing the present invention, the inventor finds at least the following disadvantages of the prior art:

After the RN is introduced to the LTE system, huge hidden security risks exist in the segmented air interface link. The data transmitted through this air interface link is vulnerable to be attacked.

SUMMARY

To ensure security of the air interface link, a method and a device for establishing a security mechanism for an air interface link are provided in embodiments of the present invention. The technical solution comprises:

a method for establishing a security mechanism for an air interface link, including:

performing security processing for a shared key of an access link according to a shared key between a relay node and a mobility management entity; and sending the shared key of the access link after the security processing to the relay node to enable the relay node to obtain the shared key of the access link based on the shared key between the relay node and the mobility management entity.

a method for establishing a security mechanism for an air interface link, including:

obtaining, by a relay node, a shared key, where the shared key includes a shared key between the relay node and a mobility management entity or a shared key between the relay node and an eNodeB; and deriving a security key used for a user plane and a security key used for a control plane of a relay link based on the shared key.

a method for establishing a security mechanism for an air interface link, including:

using, by a user equipment, a security key used for control plane that is the same as that of a relay node to perform security processing for control information transmitted between the user equipment and the relay node; and using, by the user equipment, a security key used for a user plane that is the same as that of an eNodeB to perform security processing for control information transmitted between the user equipment and the eNodeB.

a device for establishing a security mechanism for an air interface link, including:

a security processing module, configured to perform security processing for a shared key of an access link according to a shared key between a relay node and a mobility management entity; and a key sending module, configured to send the shared key of the access link after the security processing by the security processing module to the relay node to enable the relay node to obtain the shared key of the access link based on the shared key between the relay node and the mobility management entity.

a device for establishing a security mechanism for an air interface link, including:

a shared key obtaining module, configured to obtain a shared key, where the shared key includes a shared key between the relay node and a mobility management entity or a shared key between the relay node and an eNodeB; and a relay key deriving module, configured to derive a security key used for a user plane and a security key used for a control plane of a relay link based on the shared key obtained by the shared key obtaining module.

a device for establishing a security mechanism for an air interface link, including:

a control processing module, configured to use a security key used for a control plane that is the same as that of a relay node to perform security processing for control information transmitted between the device and the relay node; and a user processing module, configured to use a security key used for a user plane that is the same as that of an eNodeB to perform security processing for control information transmitted between the device and the eNodeB.

The benefits of the technical solution provided in an embodiment of the present invention are as follows:

By using the shared key of the relay node and mobility management entity to perform security processing for the shared key of the access link before sending the shared key of the access link, the security of the access link is enhanced. By deriving the security key used for the user plane and the security key used for the control plane of the relay link, the security of the relay link is enhanced. By deriving the security key used for the user plane and the security key used for the control plane based on different entities and different shared keys, the security of the air interface link is enhanced. Therefore, the present invention reduces the possibility at which the air interface link is hacked, thereby improving the security of the air interface link.

DETAILED DESCRIPTION

To clarify the purpose, technical scheme, and advantages of the embodiments of the present invention, the embodiments of the present invention are described with drawings as follows.

Figure 1:
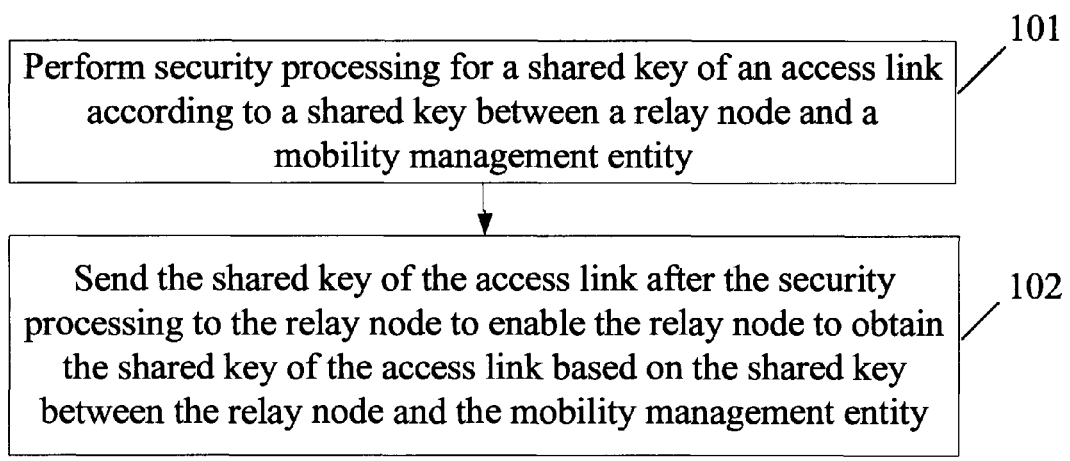
FIG. 1 shows a flow chart of a method for establishing a security mechanism for an air interface link provided in an embodiment of the present invention.

A method for establishing a security mechanism for an air interface link is provided in an embodiment of the present invention, as shown in FIG. 1. This method includes:

Step 101: Perform security processing for a shared key of an access link according to a shared key between a relay node and a mobility management entity; and Step 102: Send the shared key of the access link after the security processing to the RN to enable the relay node to obtain the shared key of the access link based on the shared key between the relay node and the mobility management entity.

The method provided in an embodiment of the present invention uses the shared key between the relay node and the mobility management entity to perform security processing on the shared key of the access link and then sends the shared key of the access link to the relay node, thereby eliminating the hidden security dangers that are generated because the eNodeB can obtain the shared key of the access link between the user equipment and the relay node after the relay node is introduced to the LTE system. Therefore, the security of a shared key between the user equipment and the relay node is ensured, the possibility that the air interface link is attacked is reduced, and the security of the air interface link, especially the access link is improved.

To eliminate the hidden security dangers that are generated because the eNB can obtain the shared key of the access link, a method for establishing a security mechanism for an air interface, especially a method for establishing a security mechanism for an access link, is provided in another embodiment of the present invention.

Figure 2A:
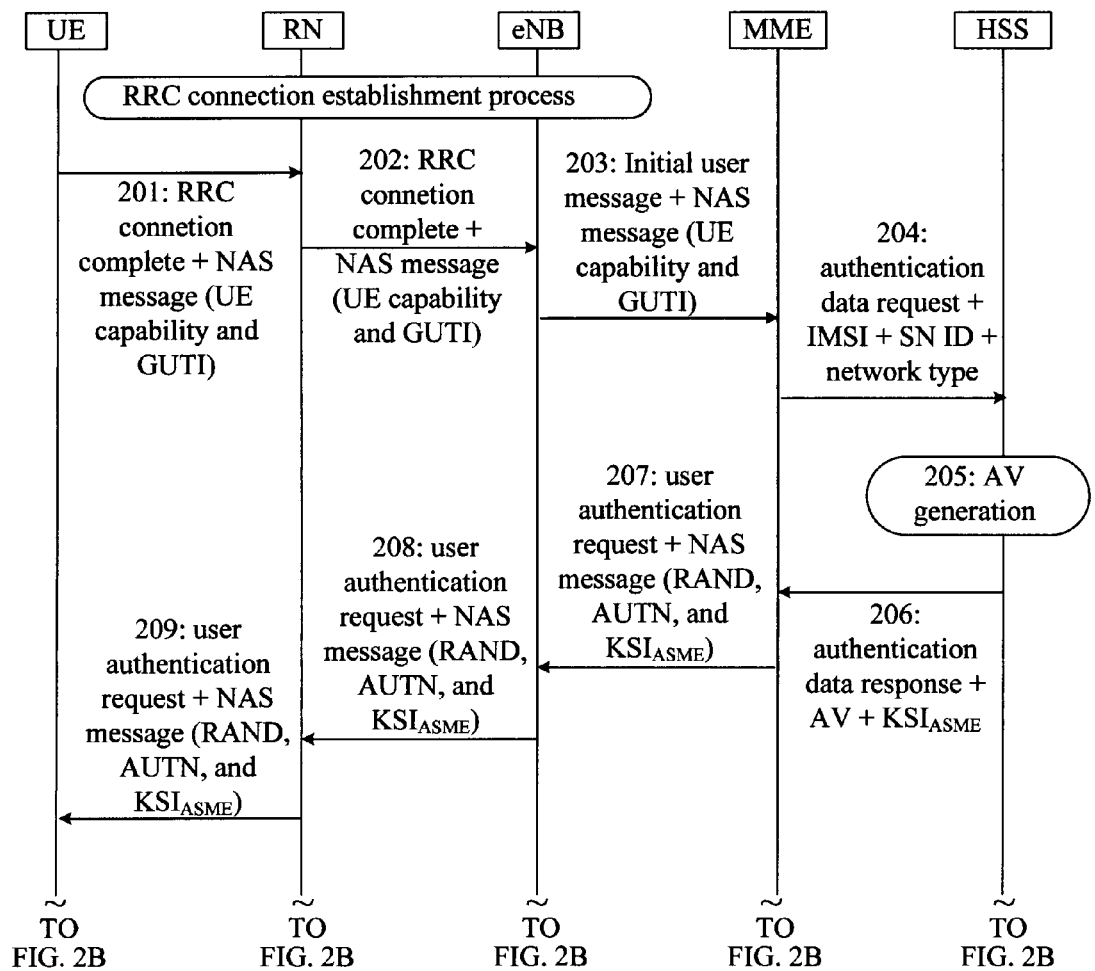
FIG. 2A and FIG. 2B show a signaling exchange flow of establishing a security mechanism for an air interface link provided in an embodiment of the present invention.
Figure 2B:
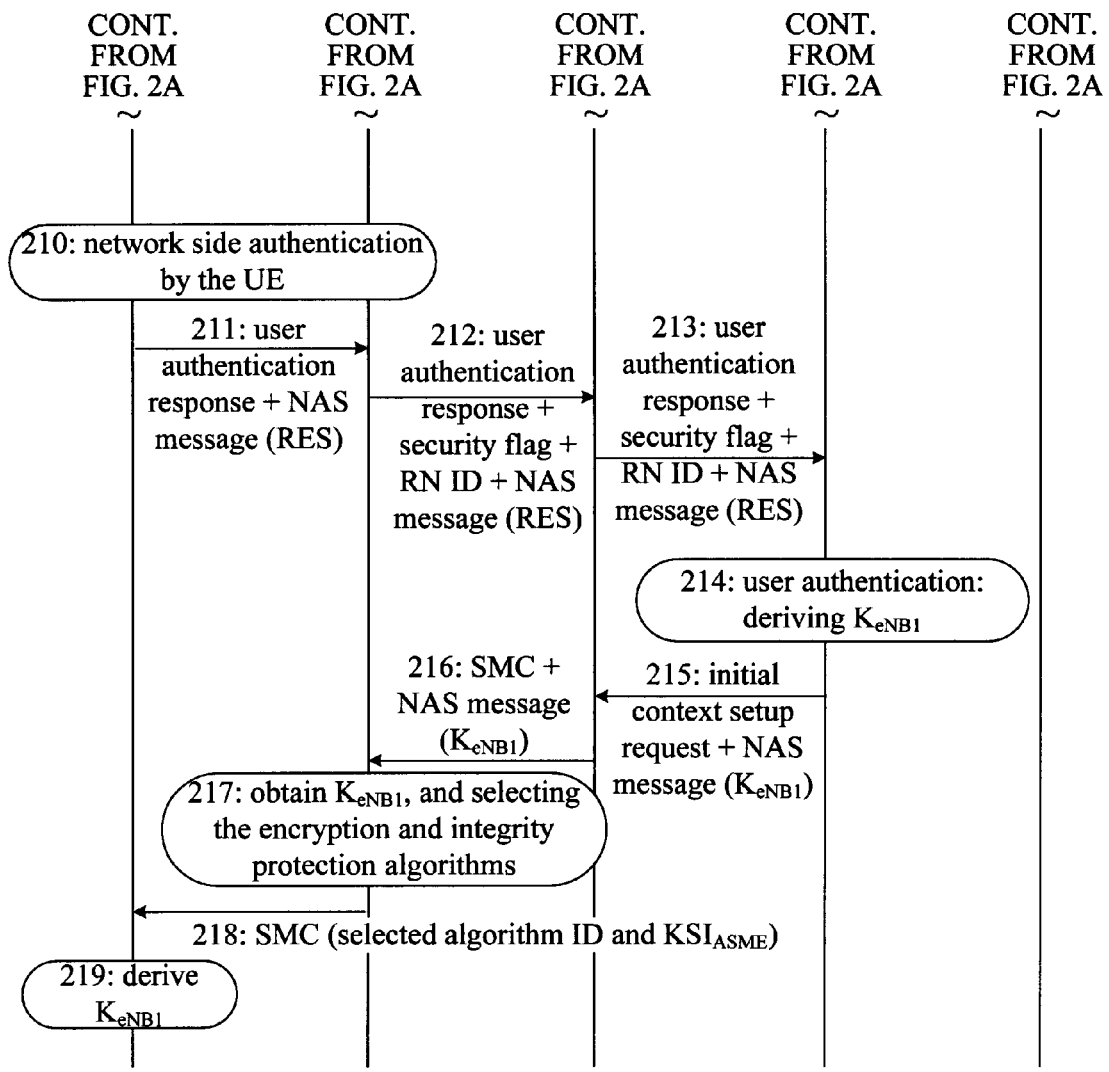

After the RN is introduced to the LTE system, the air interface link between the UE and the eNB is segmented into an access link between the UE and the RN and a relay link between the RN and the eNB. In this embodiment, the air interface link includes the relay link and the access link. Referring to FIG. 2, the access authentication process of the UE access process is as follows:

First, the UE establishes a Radio Resource Control (RRC) connection with the eNB.

Then, the UE needs to authenticate the network side. For the specific procedure, see steps 201 to 210:

Step 201: The UE sends an RRC Connection Complete message to an RN.

The RRC Connection Complete message carries a Non-Access Stratum (NAS) message which encapsulates information such as a UE capability, Globally Unique Temporary Identifier (GUTI), and root key identity $KSI_{ASME}$, where the UE capability indicates encryption and integrity protection algorithms that are supported by the UE.

Step 202: The RN forwards the received RRC Connection Complete message to the eNB.

Step 203: After receiving the RRC Connection Complete message, the eNB sends an Initial UE message to the MME through an S1-AP interface.

The Initial UE message carries the NAS message.

Step 204: After receiving the Initial UE message, the MME searches an International Mobile Subscriber Identity (IMSI) corresponding to the UE according to the GUTI carried in the Initial UE message, and sends an Authentication Data Request to a Home Subscriber Server (HSS).

The Authentication Data Request carries information such as an IMSI, a Service Network Identity (SN ID), and a Network Type.

Step 205: After receiving the Authentication Data Request, the HSS finds a shared key K corresponding to the UE according to the IMSI of the UE, randomly generates a random number RAND, and generates an Authentication Vector (AV)

corresponding to the UE according to the RAND, a Sequence Number (SQN) that is currently saved by the HSS, and a shared key K of the UE and network side.

The AV includes an RAND, Expected Response (XRES), $K_{ASME}$, and Authentication Token (AUTN). The RAND is a random number, the XRES is an expected response, the $K_{ASME}$ is a root key found according to $KSI_{ASME}$, and the AUTN is an authentication token. The AUTN further includes three parts: an SQN, an Authentication Management Filed (AMF), and a Message Authentication Code (MAC).

Step 206: The HSS returns an Authentication Data Response to the MME.

The response carries the AV and the key identifier $KSI_{ASME}$ corresponding to the key $K_{ASME}$.

Step 207: The MME saves the received AV and sends a User Authentication Request to the eNB through the S1-AP interface.

The User Authentication Request carries an NAS message that encapsulates information such as RAND, AUTN, and $KSI_{ASME}$.

Step 208: The eNB forwards the received User Authentication Request to the RN.

Step 209: The RN forwards the received User Authentication Request to the UE.

Step 210: The UE performs verification according to the received RAND and AUTN;

The verification process includes: calculating a MAC value according to the RAND, SQN in the AUTN, and a key K shared with the network side, and comparing the calculated MAC value with the MAC value parsed from the received AUTN to verify whether they are consistent. If the calculated MAC value is consistent with the MAC value parsed from the received AUTN, the authentication performed by the UE for the network side succeeds; otherwise, the authentication fails.

By this time, the UE completes the authentication for the network side, and the network side starts to perform access authentication for the UE. For the access authentication procedure, see steps 211 to 214:

Step 211: After the authentication performed by the UE for the network side succeeds, the UE calculates a response RES by using the RAND and the key K that is shared with the network side, encapsulates the RES in an NAS message, and sends the NAS message to the RN through an RRC message such as a User Authentication Response.

Step 212: After receiving the RRC message sent by the UE, the RN extracts the NAS message from the RRC message, bears the NAS message and a related parameter in an RRC message of the relay link, such as a User Authentication Response, and sends the RRC message to the eNB. To ensure security of the RRC message, the shared key between the RN and the eNB may be used for encryption and integrity protection, where encryption performed by using the shared key is optional, and integrity protection performed by using the shared key is mandatory.

The related parameter may include a security identifier such as a Security flag, and an identifier of the relay node such as RN GUTI;

The parameter Security flag is used to notify the MME of whether to perform encryption or integrity protection for a derived shared key of the access link by using a specified key before delivery. For example, the value of this field can be of a Boolean type. That is, when the value of this field is set to true, the key shared with the RN needs to be used for performing security processing for the derived key, such as encryption or integrity protection; when the value is set to false, no key needs to be used for performing security processing for the derived key. It should be noted that the default value of this parameter is false, or if the parameter is default in the message, the value of this parameter is regarded as false by default. In this embodiment, for the case in which the UE is accessed to the eNB through the RN, the Security flag needs to be set to true; for the case in which the UE is directly accessed to the eNB in an existing system, the Security flag needs to be set to false. The purpose of this setting method is to not change the derivation hierarchy of the existing system, thereby facilitating compatibility with the existing system;

The parameter RN GUTI is used by the MME to identify the RN, help the MME find the NAS key corresponding to the RN, and use the found NAS key to perform corresponding encryption or integrity protection for the derived air interface AS key. The RN GUTI field is optional. When the Security flag is set to true, the RN GUTI field must exist. When the Security flag is set to false or default, the RN GUTI field does not exist.

Further, the related parameter of security identifier such as a Security flag, and an identifier of the relay node such as RN GUTI, can be encapsulated in another NAS message, and the another NAS message is borne and sent through the RRC message.

Step 213: After receiving the RRC message sent by the RN, the eNB extracts the NAS message and the related parameter from the RRC message, re-encapsulates the NAS message and the related parameter in an S1-AP interface message, such as a User Authentication Response, and sends the S1-AP interface message to the MME.

Further, if the related parameter is encapsulated in another NAS message, after receiving the RRC message sent by the RN, the eNB extracts the NAS message and the another NAS message, re-encapsulates the two NAS messages in an S1-AP interface message, such as a User Authentication Response, and sends the S1-AP interface message to the MME.

Step 214: After receiving the S1-AP interface message sent by the eNB, the MME authenticates the UE; after the authentication succeeds, the MME further derives a shared key of an access link corresponding to the UE, assuming $K_{eNB1}$, and performs security processing for the shared key according to the related parameter.

The authentication process includes: comparing, by the MME, the received RES with the XRES in the AV of the UE to verify whether they are consistent. If the received RES is consistent with the XRES, authentication performed by the network side for the UE succeeds; otherwise, the authentication fails;

The process of deriving the shared key of the access link corresponding to the UE may be: obtaining $K_{eNB1}$ through a Key Derivation Function (KDF) function according to parameters such as the root key $K_{ASME}$ and NAS Count, for example, $K_{eNB1}$=KDF ($K_{ASME}$, NAS Count);

The process of performing security processing according to the related parameter is as follows: The MME determines, according to the received security flag, whether to perform related security processing during derivation of the air interface key; the MME does not perform security processing by using the key shared with the RN for the derived air interface key if the value of the Security flag is false, which is the same as the existing system; and if the value of the Security flag is true, the MME searches for, according to the received RN GUTI field, the shared key that is between the RN and the MME and corresponds to the RN GUTI field, such as a NAS key and a root key $K_{ASME}$, and using the shared key between the RN and the MME to perform security processing for the $K_{eNB1}$ or NAS message, where the NAS message encapsulates the $K_{eNB1}$. The security processing in embodiments of the present invention all indicates encryption or integrity protection. For example, the NAS integrity protection key $K_{NASint}$ can first be used for performing integrity protection for the $K_{eNB1}$, and then the NAS encryption key $K_{NASenc}$ is used for performing encryption processing for the $K_{eNB1}$.

By this time, the network side completes authentication for the UE and derives the shared key. The MME needs to distribute the shared key. For the specific procedure, see steps 215 to 219:

Step 215: The MME sends an Initial Context Setup Request to the eNB through an S1-AP interface, where the request carries the NAS message after the security processing by using the shared key between the RN and the MME, and the NAS message encapsulates parameters such as the $K_{eNB1}$ or $K_{eNB1}$ after security processing, UE capability, Next Hop (NH), and Next Hope Chaining Counter (NCC);

Step 216: The eNB receives the Initial Context Setup Request, but not obtains the $K_{eNB1}$ because no shared key between the RN and the MME is available for decryption, and then sends the NAS message after security processing or the $K_{eNB1}$ after security processing that is carried in the request to the RN through a Security Mode Command (SMC);

Step 217: The RN extracts the NAS message after security processing or the $K_{eNB1}$ after security processing from the SMC, and obtains the $K_{eNB1}$ by performing decryption by using the shared key between the RN and the MME.

Step 218: The RN determines an algorithm for deriving the security keys used for user plane and control plane according to the encryption and integrity protection algorithms supported by the RN and the UE, and sends ID of the determined algorithm, $KSI_{ASME}$, NCC, and other parameter to the UE through an SMC; and Step 219: The UE uses the same method as the MME to derive $K_{eNB1}$ according to an agreement with the core network during network access, and initializes a value of NH to $K_{eNB1}$, and that of NCC to 0.

By this time, the UE and RN can derive the security keys used for user plane and control plane (encryption or integrity protection keys) of the air interface by using the shared $K_{eNB1}$ through a selected key algorithm.

After steps 201 to 219, an entire Authentication and Key Agreement (AKA) access authentication process is complete.

In the embodiment of the present invention, the UE does not need to undergo an entire AKA access authentication process during each network access. For example, if the network side, such as the MME, has stored security context information related to the UE during network access of the UE, the identity authentication process (steps 201 to 214) in the AKA process may be omitted. In this case, the related parameter, such as a Security flag and RN GUTI, that indicate the MME to perform security protection do not need to be carried in the messages of the original AKA process, but can be carried in a message such as an RRC connection complete message in the exchange procedure before the AKA process.

In addition, in the preceding AKA access authentication process (steps 201 to 219), the RN sends the related parameter, such as a Security flag and RN GUTI, to the MME. In this embodiment, the eNB can replace the RN to send the two related parameters to the MME. The identity authentication and $K_{eNB1}$ distribution process is consistent with the process of sending, by the RN, the related parameter.

In addition, when the RN is visible to the core network, that is, the eNB transparently transmits only data, and the MME appears to directly communicate with the RN, the MME can perform security protection on the $K_{eNB1}$ by using the Internet Protocol Security (IPsec) protection mechanism before sending the $K_{eNB1}$. Specifically, the MME can perform security processing on the $K_{eNB1}$ by using the network domain security protection key between the RN and the MME before sending the $K_{eNB1}$.

The preceding key derivation method eliminates the hidden security dangers that are generated because the eNB can obtain the shared key of the access link between the UE and the RN after the RN is introduced to the LTE system, ensures security of the shared key between the UE and the RN, reduces the possibility that the air interface link is hacked, and guarantees the security of the air interface link, especially the access link.

It should be noted that the security protection method of the access link and the security protection method of the relay link can either or both apply to the security protection of the air interface link.

Figure 3:
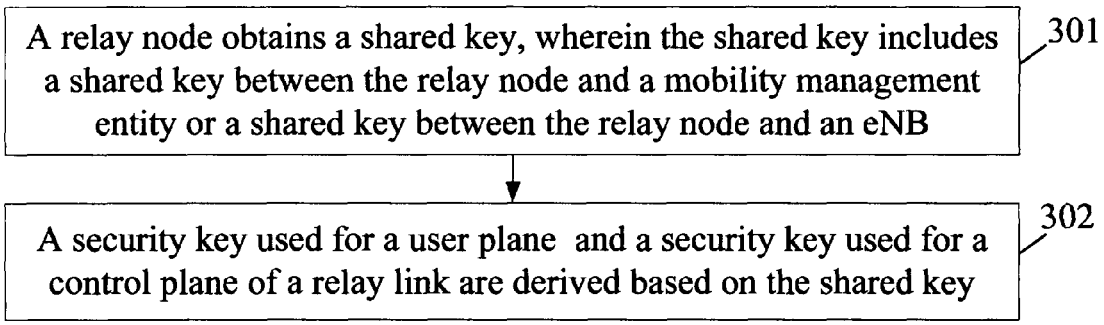
FIG. 3 shows a flow chart of a method for establishing a security mechanism for a relay link provided in an embodiment of the present invention.

As shown in FIG. 3, a method for establishing a security mechanism for an air interface link, especially a relay link, is provided in another embodiment of the present invention. The method includes:

Step 301: A relay node obtains a shared key, where the shared key includes a shared key between the relay node and a mobility management entity or a shared key between the relay node and an eNodeB.

Step 302: Derives a security key used for a user plane and a security key used for a control plane of a relay link based on the shared key.

The method provided in this embodiment of the present invention derives the security key used for the user plane and the security key used for the control plane of a relay link based on the shared key and uses the security key used for the user plane and the security key used for the control plane to perform security protection for the data transmitted on the relay link, thereby improving the security of the air interface link, especially the relay link.

The security of the air interface link includes the security of the access link and the security of the relay link. Therefore, a method for establishing a security mechanism for an air interface link, especially a relay link, is provided in another embodiment of the present invention.

During network access, the RN establishes a security association with the eNB for negotiating the shared key between the RN and the eNB. The RN and eNB each can derive a security key used for a user plane and a security key used for a control plane of the relay link based on the shared key between the RN and the eNB, and use the security key used for the user plane and the security key used for the control plane of the relay link to exchange information.

When the RN is visible to a core network, that is, the eNB transparently transmits only data, and the MME appears to directly communicate with the RN, the security protection for the relay link between the RN and the eNB can be implemented through the security protection between the RN and the MME, that is, by using the shared key between the RN and the MME. Specifically, security protection can be implemented based on the security association established with the network side MME during network access of the RN, for example, by using the NAS key shared between the RN and the MME or a root key $K_{ASME}$ to further derive security keys used for the user plane and the control plane for protection. In addition, the security protection between the RN and the eNB can be implemented based on the IPsec protocol for network domain security protection.

For all UEs attached to an RN, the method provided in this embodiment of the present invention uses a same security key for security protection on the relay link, greatly improving security of the air interface link, especially the relay link, compared with the prior art.

To make different UEs attached to a same RN use different security keys for security protection, another method for establishing a security mechanism for an air interface link, especially a relay link, is provided in another embodiment of the present invention.

First, during network access of a UE, the MME derives a shared key (assuming $K_{eNB2}$) of a relay link between an RN and an eNB for the UE.

Specifically, a method the same as the method for deriving a shared key of an access link can be used. For example, $K_{eNB2}$ is obtained by using a KDF function based on parameters such as a root key $K_{ASME}$ and NAS Count. For example, $K_{eNB2}$=KDF ($K_{ASME}$, NAS Count). For each UE, the $K_{ASME}$ is unique. Therefore, the $K_{eNB2}$ derived based on $K_{ASME}$ is unique for each UE.

Then, the MME sends the $K_{eNB2}$ to the eNB through an S1-AP interface.

Then, the eNB forwards the $K_{eNB2}$ to the RN.

Finally, the eNB and RN each derive a security key used for a user plane and a security key used for a control plane of the relay link based on $K_{eNB2}$.

In addition, the shared key of the relay link between the RN and the eNB can be implemented in the following way:

The RN and eNB each calculate the shared key of the UE on the relay link based on the shared key negotiated with the eNB during network access of the RN and by combining a UE feature parameter, where the UE feature parameter may be a UE ID, or a key derived by the MME for the UE; then, the RN and eNB derive the security key used for the user plane and the security key used for the control plane of the relay link based on the calculated shared key.

After the preceding process, when information is transmitted on the relay link, security protection may be implemented by using the security key used for the user plane and the security key used for the control plane of the relay link.

For all UEs attached to the RN, the method provided in this embodiment of the present invention uses different security keys for security protection on the relay link, greatly improving security of the relay link.

Figure 4:
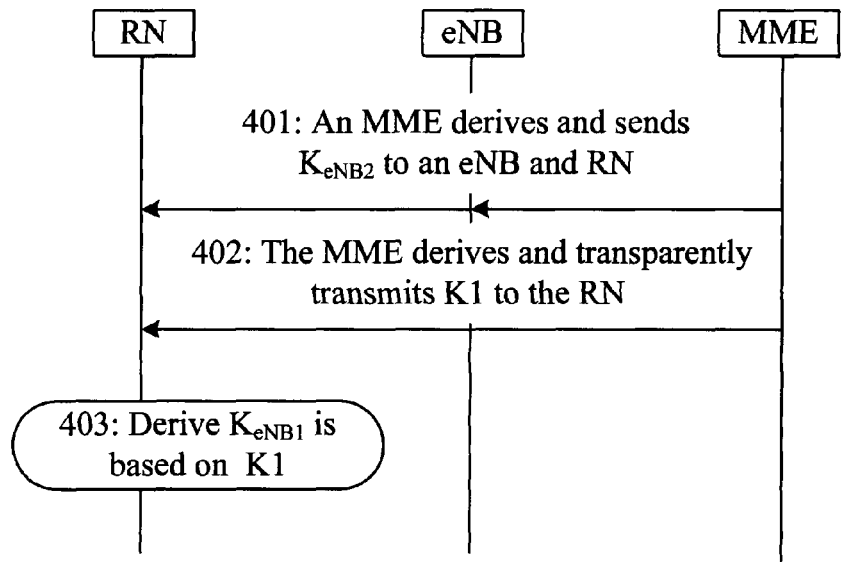
FIG. 4 shows a signaling exchange flow of deriving shared keys for an access link and a relay link provided in an embodiment of the present invention.

To ensure security of the air interface link, another method for establishing a security mechanism for an air interface link, especially a method for deriving shared keys for an access link and a relay link, is provided in another embodiment of the present invention. Referring to FIG. 4, the method includes:

Step 401: An MME derives a shared key $K_{eNB2}$ of a relay link, and sends the $K_{eNB2}$ to an eNB and an RN.

Specifically, the MME can use a root key $K_{ASME}$ and NAS Count as parameters and obtain the $K_{eNB2}$ by using the KDF function, for example, $K_{eNB2}$=KDF ($K_{ASME}$, NAS Count).

Step 402: The MME derives a first temporary key K1, uses a shared key between the RN and the MME to perform security processing for K1, and transparently transmits K1 after the security processing to the RN through the eNB.

Specifically, the MME can use the root key $K_{ASME}$ and $K_{eNB2}$ as parameters and obtain K1 by using the KDF function, for example, K1=KDF ($K_{ASME}$, $K_{eNB2}$).

Step 403: The RN derives a shared key $K_{eNB1}$ of an access link based on the received K1.

Specifically, the RN can use K1 and PCI as parameters, and obtain $K_{eNB1}$ by using the KDF function. For example, $K_{eNB1}$=KDF (K1, PCI), where, the PCI can be a physical cell identity of a coverage cell of the RN.

Figure 5:
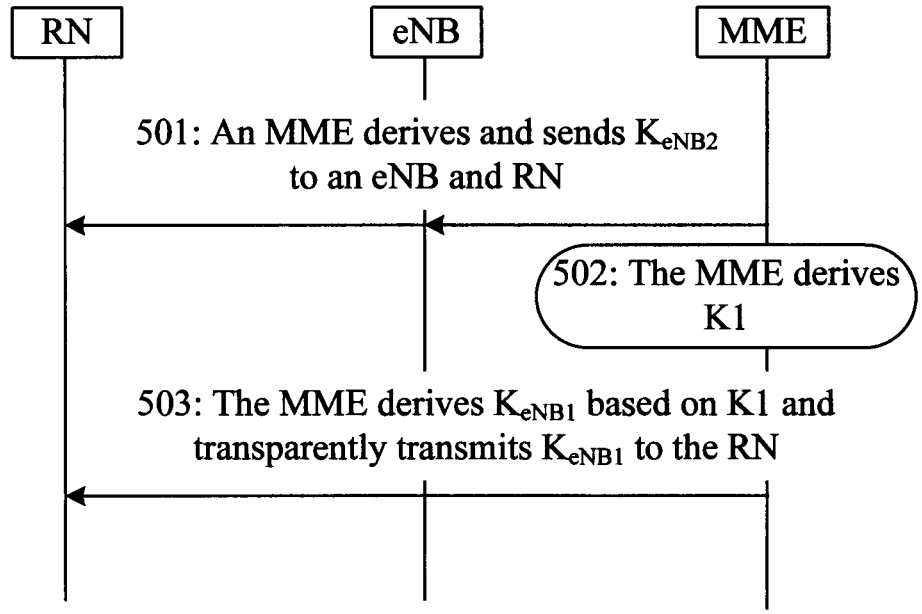
FIG. 5 shows another signaling exchange flow of deriving shared keys for an access link and a relay link provided in an embodiment of the present invention.

Or, referring to FIG. 5, the method for deriving shared keys for the access link and relay link can be implemented in the following way:

Step 501: An MME derives a shared key $K_{eNB2}$ of the relay link, and sends $K_{eNB2}$ to an eNB and an RN.

Specifically, the MME can use a root key $K_{ASME}$ and NAS Count as parameters and obtain by using the KDF function, for example, $K_{eNB2}$=KDF ($K_{ASME}$, NAS Count).

Step 502: The MME derives a first temporary key K1.

Specifically, the MME can use a root key $K_{ASME}$ and $K_{eNB2}$ as parameters and obtain K1 by using the KDF function, for example, K1=KDF ($K_{ASME}$, $K_{eNB2}$).

Step 503: The MME derives $K_{eNB1}$ based on K1, uses the shared key between the RN and the MME to perform security processing for $K_{eNB1}$, and transparently transmits $K_{eNB1}$ after the security processing to the RN through the eNB.

Specifically, the RN can use K1 and PCI as parameters, and obtain $K_{eNB1}$ by using the KDF function. For example, $K_{eNB1}$=KDF (K1, PCI), where, the PCI can be a physical cell identity of a coverage cell of the RN.

Accordingly, the network side sends an indication for deriving a shared key of the access link and an indication for key synchronization to the UE, for example, through a security mode command. The UE performs the process of deriving $K_{eNB1}$. Specifically, the process is as follows: $K_{eNB2}$=KDF ($K_{ASME}$, NAS Count); K1=KDF ($K_{ASME}$, $K_{eNB2}$); $K_{eNB1}$ KDF (K1, PCI).

The method for deriving shared keys (steps 401, 402, and 403, or steps 501, 502, and 503) greatly improves security of the access link and relay link. However, the method is not compatible with an Rel-8 (R8) UE. It is requested that the R8 UE can synchronize the temporary key according to the indication for key synchronization during initial network access, and then obtains $K_{eNB1}$ based on the temporary key. In this case, the derivation hierarchy of the shared key of the access link is changed. Therefore, this method applies to only an R10 UE.

Figure 6:
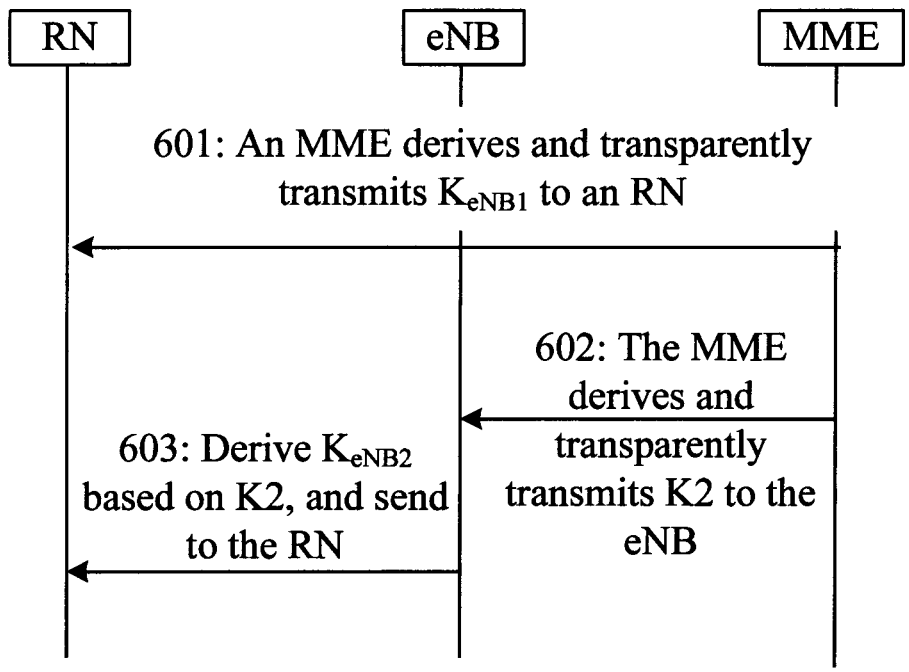
FIG. 6 shows another signaling exchange flow of deriving shared keys for an access link and a relay link provided in an embodiment of the present invention.

Another embodiment of the present invention provides another method for establishing a security mechanism for an air interface link, especially a method compatible with R8 UE for deriving a shared key. Referring to FIG. 6, the method includes:

Step 601: An MME derives a shared key $K_{eNB1}$ of an access link, uses a shared key between an RN and the MME to perform security processing for $K_{eNB1}$, and transparently transmits $K_{eNB1}$ after the security processing to the RN through an eNB.

Specifically, the MME can use a root key $K_{ASME}$ and NAS Count as parameters and obtain by using the KDF function, for example, $K_{eNB2}$=KDF ($K_{ASME}$, NAS Count).

Step 602: The MME derives a second temporary key K2, and sends K2 to the eNB.

Specifically, the MME can use a root key $K_{ASME}$ and shared key $K_{eNB1}$ of the access link as parameters and obtain K2 by using the KDF function, for example, K2=KDF ($K_{ASME}$, $K_{eNB1}$).

Step 603: The eNB derives the shared key $K_{eNB2}$ of the relay link based on the received K2, and sends $K_{eNB2}$ to the RN.

Specifically, the eNB can use K2 and PCI as parameters, and obtain $K_{eNB2}$ by using the KDF function. For example, $K_{eNB2}$=KDF (K2, PCI), where, the PCI can be a physical cell identity of a coverage cell of the RN or a physical cell identity of a coverage cell of the eNB.

Accordingly, the network side sends an indication for deriving a shared key of the access link to the UE, for example, through a security mode command. The UE performs the process of deriving $K_{eNB1}$. Specifically, the process is as follows: $K_{eNB1}$=KDF ($K_{ASME}$, NAS Count).

The method (steps 601, 602, and 603) for deriving a shared key greatly improves security of the access link and relay link. In addition, this method does not change a derivation hierarchy of the shared key of the access link, and therefore is compatible with R8 UEs in existing systems.

Figure 7:
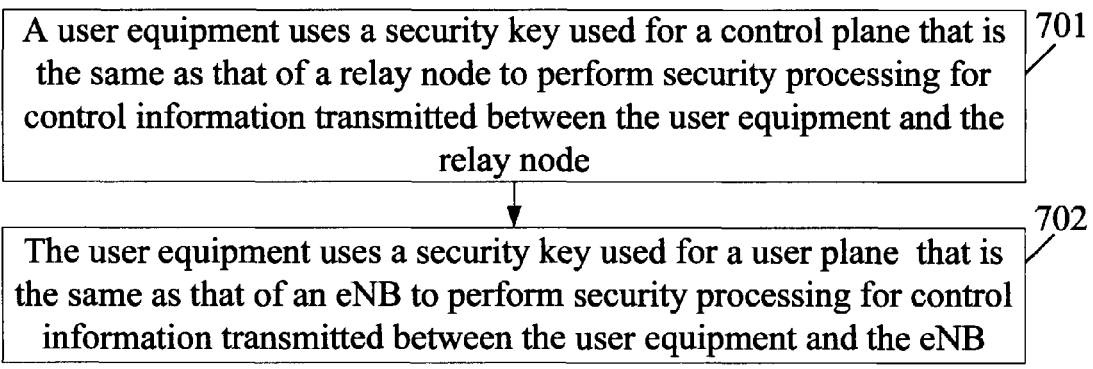
FIG. 7 shows a flow chart of another method for establishing a security mechanism for an air interface link provided in an embodiment of the present invention.

Referring to FIG. 7, a method for establishing a security mechanism for an air interface link is provided in an embodiment of the present invention. The method includes:

Step 701: A user equipment uses a security key used for a control plane that is the same as that of a relay node to perform security processing for control information transmitted between the user equipment and the relay node.

Step 702: The user equipment uses a security key used for a user plane that is the same as that of an eNB to perform security processing for control information transmitted between the user equipment and the eNB.

In the method provided in an embodiment of the present invention, the security key used for the user plane is shared only between the UE and the eNB, and the RN needs to only transparently transmit data but does not need to perform encryption and decryption, thereby shortening the processing time of user plane data transmission, reducing the possibility that user data is hacked to a certain extent, and improving security of the air interface link.

Figure 8:
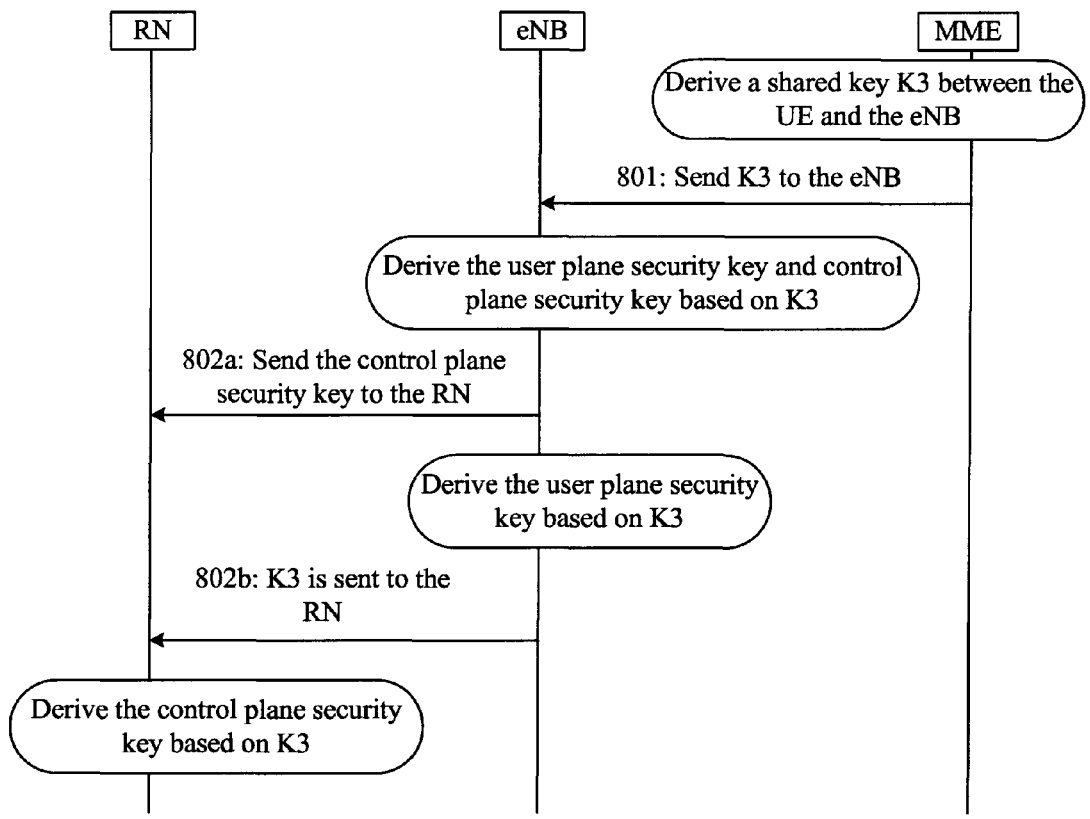
FIG. 8 shows a signaling exchange flow of deriving security keys based on different entities provided in an embodiment of the present invention.

A method for establishing a security mechanism for an air interface link, especially a method for deriving a security key used for a user plane and a security key used for a control plane, is provided in another embodiment of the present invention. This method applies to the scenario in which the security key used for the user plane and the security key used for the control plane are located at different entities, that is, the UE and the RN share the security key used for the control plane, and the UE and the eNB share the security key used for the user plane. Referring to FIG. 8, the method includes:

Step 801: An MME derives, a shared key between a UE and an eNB, assuming K3, and sends K3 to an eNB through an S1-AP interface.

Step 802: Two derivation ways are provided after the eNB receives K3:

Step 802*a*: The eNB derives a security key used for the user plane and a security key used for the control plane each based on the K3, and sends the derived security key used for the control plane to an RN. Or, Step 802*b*: The eNB derives a security key used for a user plane based on the K3, and then sends the K3 to the RN, and the RN derives a security key used for a control plane based on the received K3.

Accordingly, the UE derives the security keys used for the user plane and the control plane based on K3.

The RN has the function of controlling the UE. Therefore, the security key used for the control plane is shared between the UE and the RN. However, for the user plane data, the user plane data needs to be forwarded through the RN to the eNB. If the security key used for the user plane is shared only between the UE and the eNB, the RN needs to only transparently transmit data, that is, the RN does not need to perform encryption and decryption processing for the received data, thereby shortening the processing time of user plane data transmission, reducing the possibility that user data is hacked to a certain extent, and improving security of the air interface link.

Figure 9:
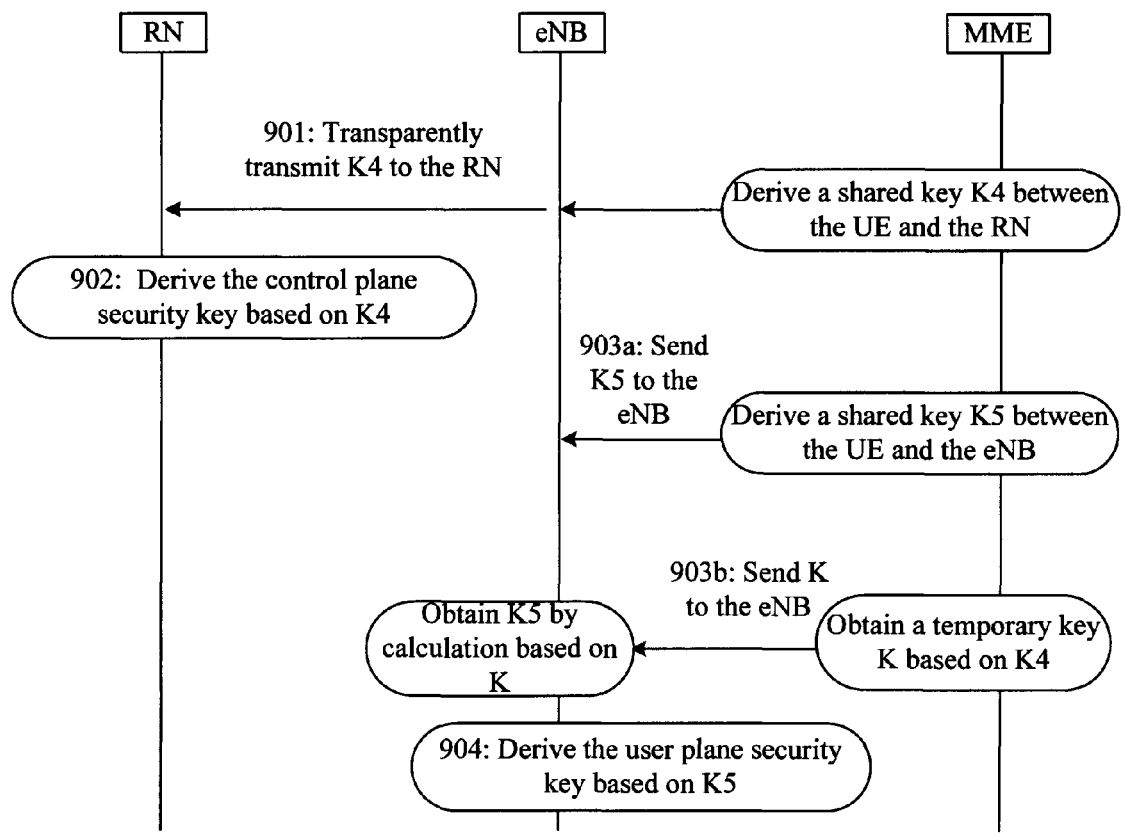
FIG. 9 shows a signaling exchange flow of deriving security keys based on different shared keys provided in an embodiment of the present invention.

Another embodiment of the present invention further provides a method for establishing a security mechanism for an air interface link, especially a method for deriving a security key used for a user plane and a security key used for a control plane based on different shared keys. Referring to FIG. 9, the method includes:

Step 901: An MME derives a shared key between a UE and an RN for the UE, assuming K4, and sends K4 to the RN after performing security processing by using a shared key between the RN and the MME.

Step 902: The RN receives and obtains K4 through parsing, and derives a security key used for a control plane based on K4.

Step 903: An eNB obtains a shared key, assuming K5, between the UE and the eNB by using one of the two methods:

Method 1: The MME allocates another shared key K5 for the UE, and sends K5 through an S1-AP interface to the eNB. K5 is independent of K4, that is, K5=KDF ($K_{ASME}$, parameter x), where, parameter x can be a parameter known to the UE and MME, for example, eNB ID and NAS Count.

Method 2: The MME obtains an air interface temporary key K through calculation based on K4, that is, K=KDF ($K_{ASME}$, K4), and sends K to the eNB through the S1-AP interface for the eNB to obtain the shared key K5 between the UE and the eNB, that is, K5=KDF (K, PCI).

Step 904: The eNB derives a security key used for a user plane of an air interface based on K5.

The preceding describes the process of respectively deriving by the network side the security key used for the control plane and the security key used for the user plane based on different shared keys K4 and K5. The sequence for deriving K4 and K5 is not confined. Accordingly, the sequence for deriving the security key used for the control plane and the security key used for the user plane based on K4 and K5 is not confined.

Accordingly, the process of deriving by the UE the security key used for the control plane and the security key used for the user plane is as follows:

First, the UE obtains K5 through calculation, that is, K5=KDF ($K_{ASME}$, parameter x), where, parameter x should be transferred to the UE in a proper message, or be a parameter known to the UE and MME, for example, eNB ID and NAS Count.

Or,

The UE synchronizes the temporary key according to an indication for key synchronization to obtain the temporary key through K=KDF ($K_{ASME}$, K4), and then obtains K5 through calculation as follows: K5=KDF (K, PCI).

Then, the UE derives a security key used for a control plane based on K4, and a security key used for a user plane based on K5.

The method provided in this embodiment derives the security key used for the user plane and the security key used for the control plane based on different shared keys, eliminating the hidden security dangers in derivation based on a same shared key, separating the security of the control plane from that of the user plane, and improving the security of the air interface link. In addition, the security key used for the user plane is shared only between the UE and the eNB, and the RN needs to only transparently transmit data but does not need to perform encryption and decryption processing for the received data, thereby shortening the processing time of user plane data transmission, reducing the possibility that user data is hacked to a certain extent, and improving security of the air interface link.

Figure 10:
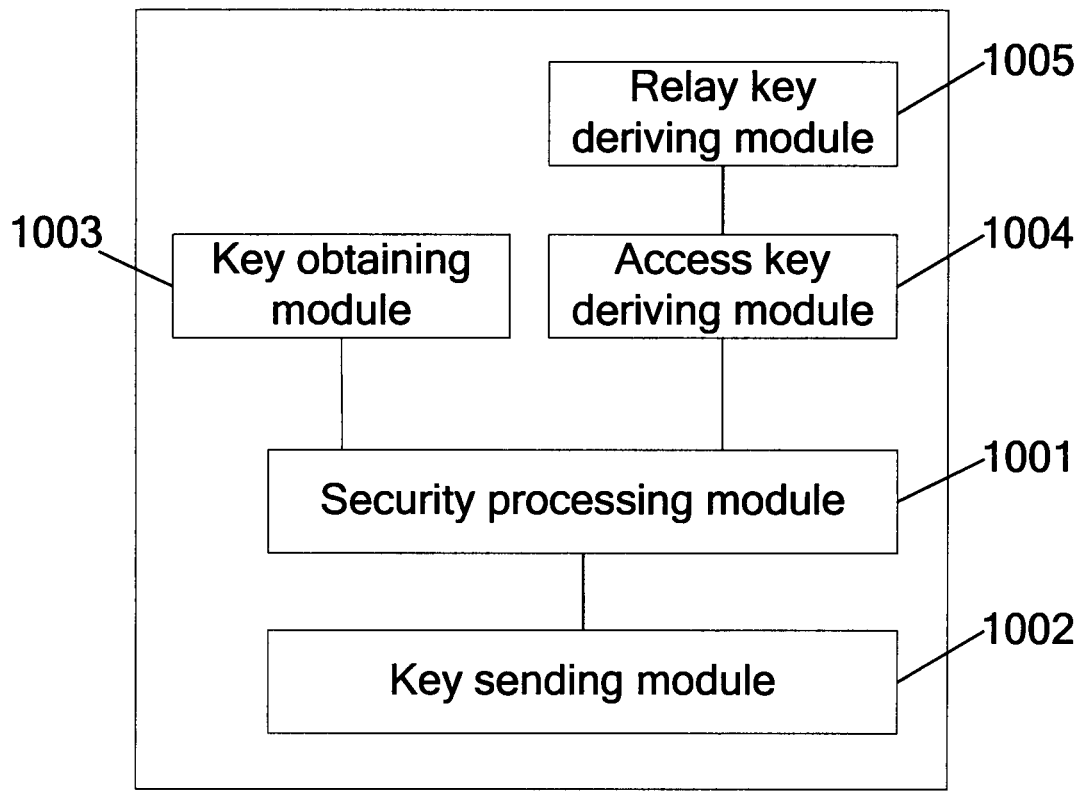
FIG. 10 shows a structure of a communication device provided in an embodiment of the present invention.

Referring to FIG. 10, an embodiment of the present invention provides a communication device. The device includes:

a security processing module 1001, configured to perform security processing for a shared key of an access link based on a shared key between a relay node and a mobility management entity; and a key sending module 1002, configured to send the shared key of the access link for which after the security processing module 1001 performs the security processing to the relay node to enable the relay node to obtain the shared key of the access link based on the shared key between the relay node and the mobility management entity.

Further, the device may further include:

a key obtaining module 1003, configured to obtain an identifier of the relay node, and obtain the shared key between the relay node and the mobility management entity based on the identifier of the relay node.

Obtaining the identifier of the relay node specifically includes: receiving an NAS message sent by the relay node, where the NAS message carries the identifier of the relay node; or, receiving an RRC message sent by the relay node or eNodeB, where the RRC message carries the identifier of the relay node, and is a user authentication response message or RRC connection complete message.

Further, the device may further include:

an access key deriving module 1004, configured to derive the shared key of the access link through the KDF function based on a root key and NAS count; or, configured to derive a shared key of a relay link based on the root key; derive a first temporary key based on the shared key of the relay link; derive the shared key of the access link based on the first temporary key and a PCI that corresponds to the relay node.

Further, the device may further include:

a relay key deriving module 1005, configured to derive a second temporary key based on the shared key of the access link, and send the second temporary key to an eNodeB to enable the eNodeB to derive the shared key of the relay link based on the second temporary key and PCI, and send the shared key of the relay link to the relay node, where the PCI is a physical cell identity corresponding to the eNodeB or relay node.

The shared key between the relay node and the mobility management entity can be an NAS key or root key corresponding to the relay node, or a network domain security protection key.

The communication device may be a mobility management entity.

The method provided in an embodiment of the present invention uses the key shared between the relay node and the mobility management entity for security processing on the shared key of the access link before sending the shared key to the relay node, thereby eliminating the hidden security dangers generated because the eNodeB can obtain the shared key of the access link between the user equipment and the relay node after the relay node is introduced to the LTE system. Therefore, the possibility that the air interface link is hacked is reduced, and the security of the air interface link, especially the access link is improved.

Figure 11:
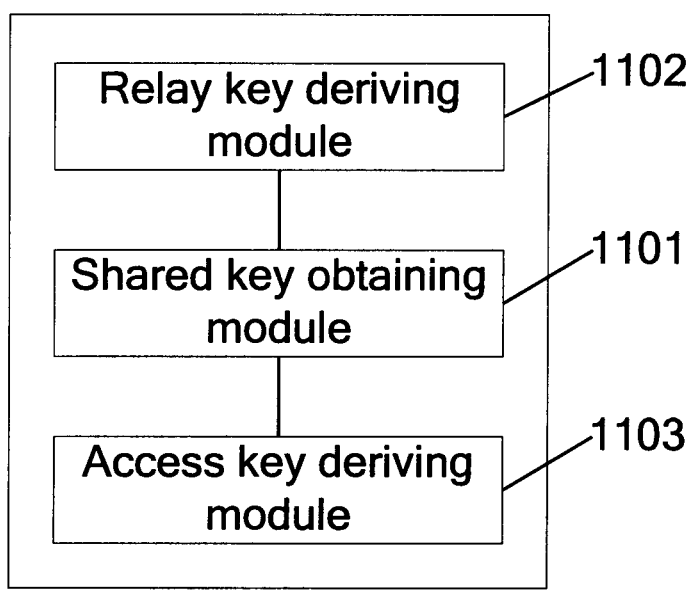
FIG. 11 shows another structure of a communication device provided in an embodiment of the present invention.

Referring to FIG. 11, an embodiment of the present invention provides a communication device. The device includes:

a shared key obtaining module 1101, configured to obtain a shared key, where the shared key includes a shared key between the relay node and a mobility management entity or a shared key between the relay node and an eNodeB; and a relay key deriving module 1102, configured to derivate a security key used for a user plane and a security key used for a control plane of a relay link based on the shared key obtained by the shared key obtaining module.

The shared key obtaining module 1101 is configured to receive the shared key between the relay node and the eNodeB sent by the mobility management entity, where the shared key between the relay node and the eNodeB is derived by the mobility management entity based on a root key;

or, obtain the shared key related to the user equipment between the relay node and the eNodeB through calculation based on a shared key negotiated by the relay node with the eNodeB during network access, and a feature parameter of the user equipment, where the feature parameter is an ID of the user equipment, or a key generated for the user equipment by the mobility management entity.

Further, the device may further include:

an access key deriving module 1103, configured to: receive a first temporary key sent by the mobility management entity, where the first temporary key is derived by the mobility management entity based on the shared key between the relay node and the eNodeB and undergoes security processing by using the shared key between the relay node and the user equipment; and derive a shared key of an access link corresponding to the relay node based on the first temporary key and the PCI that corresponds to the relay node.

The communication device may be an eNB.

The method provided in this embodiment of the present invention derives the security key used for the user plane and the security key used for the control plane of a relay link based on the shared key and uses the security key used for the user plane and the security key used for the control plane to perform security protection for the data transmitted on the relay link, thereby improving the security of the air interface link, especially the relay link.

Figure 12:
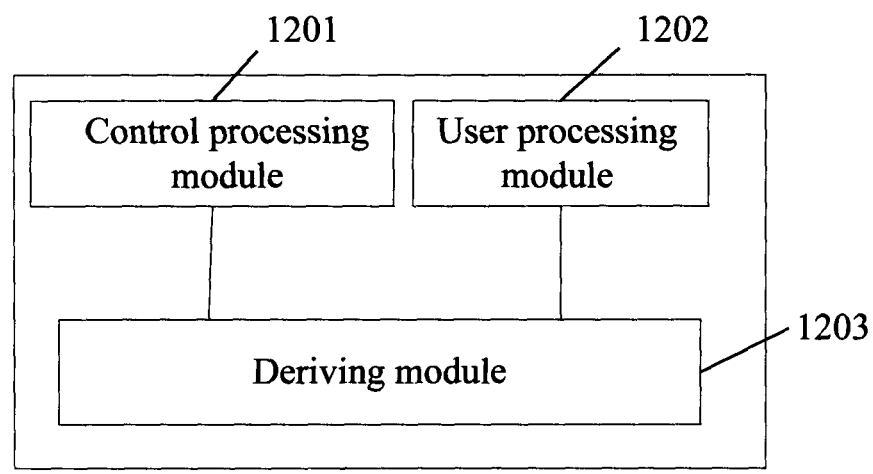
FIG. 12 shows another structure of a communication device provided in an embodiment of the present invention.

Referring to FIG. 12, an embodiment of the present invention provides a communication device. The device includes:

a control processing module 1201, configured to use a security key used for a control plane that is the same as that of a relay node to perform security processing for control information transmitted between the user equipment and the relay node; and a user processing module 1202, configured to use a security key used for a user plane that is the same as that of an eNodeB to perform security processing for control information transmitted between the user equipment and the eNodeB.

Further, the device may further include:

a deriving module 1203, configured to derive a security key used for a control plane and a security key used for a user plane of the device based on the shared key between the device and the mobility management entity; or, configured to derive the security key used for the control plane of the device based on the shared key between the device and the relay node, and derive the security key used for the user plane of the device based on the shared key between the device and the eNodeB.

The communication device may be a user equipment.

Specifically, the security key used for the user plane of the eNodeB is derived by the eNodeB based on the shared key between the user equipment and the mobility management entity; the c security key used for the control plane of the relay node is derived by the eNodeB based on the shared key between the user equipment and the mobility management entity and sent to the relay node; the user equipment derives the security key used for the user plane and the security key used for the control plane of the user equipment based on the shared key between the user equipment and the mobility management entity.

Specifically, the security key used for the user plane of the eNodeB is derived by the eNodeB based on the received shared key between the user equipment and the mobility management entity; the security key used for the control plane of the relay node is derived by the relay node based on the shared key between the user equipment and the mobility management entity and sent to the relay node; the user equipment derives the security key used for the user plane and the security key used for the control plane of the user equipment based on the shared key between the user equipment and the mobility management entity.

Specifically, the security key used for the control plane of the relay node is derived by the relay node based on the obtained shared key between the user equipment and the relay node; the security key used for the user plane of the eNodeB is derived by the eNodeB based on the shared key between the user equipment and the eNodeB, which is derived by the mobility management entity based on the shared key between the user equipment and the mobility management entity; the security key used for the control plane of the user equipment is derived by the user equipment based on the shared key between the user equipment and the relay node; the security key used for the user plane of the user equipment is derived by the user equipment based on the shared key between the user equipment and the eNodeB, which is derived by the user equipment based on the shared key between the user equipment and the mobility management entity.

Specifically, the shared key between the user equipment and the relay node obtained by the relay node is derived by the mobility management entity based on the shared key between the user equipment and the mobility management entity and sent to the relay node after security processing performed by using the shared key between the user equipment and the relay node, and the relay node obtains the shared key between the user equipment and the relay node by parsing the shared key between the user equipment and the mobility management entity; or, the shared key between the user equipment and the relay node obtained by the relay node is derived based on a temporary air interface key that is derived by the mobility management entity based on the shared key between the user equipment and the eNodeB; the shared key between the user equipment and the relay node obtained by the user equipment is derived by the user equipment based on the shared key between the user equipment and the mobility management entity; or the shared key between the user equipment and the relay node obtained by the user equipment is derived by the user equipment based on the temporary air interface key that is derived by the user equipment based on the shared key between the user equipment and the eNodeB.

Specifically, the security key used for the user plane of the eNodeB is derived by the eNodeB based on the obtained shared key between the user equipment and the eNodeB; the security key used for the control plane of the relay node is derived by the relay node based on the shared key between the user equipment and the relay node, where, the shared key between the user equipment and the relay node is derived by the mobility management entity based on the shared key between the user equipment and the mobility management entity and sent to the relay node after security processing performed by using the shared key between the user equipment and the mobility management entity, and the relay node obtains the shared key between the user equipment and the relay node by parsing the shared key between the relay node and the mobility management entity; the security key used for the user plane of the user equipment is derived by the user equipment based on the shared key between the user equipment and the eNodeB; the security key used for the control plane of the user equipment is derived by the user equipment based on the shared key between the user equipment and the relay node, and the shared key between the user equipment and the relay node is derived by the user equipment based on the shared key between the user equipment and the mobility management entity.

Specifically, the shared key between the user equipment and the eNodeB obtained by the eNodeB is derived by the mobility management based on the shared key between the user equipment and the mobility management entity and sent to the eNodeB; or the shared key between the user equipment and the eNodeB obtained by the eNodeB is derived based on a temporary air interface key that is derived by the mobility management entity based on the shared key between the user equipment and the relay node; the shared key between the user equipment and the eNodeB obtained by the user equipment is derived by the user equipment based on the shared key between the user equipment and the mobility management entity; or, the shared key between the user equipment and the eNodeB obtained by the user equipment is derived by the user equipment based on the temporary air interface key that is derived by the user equipment based on the shared key between the user equipment and the relay node.

All or parts of the content in the technical schemes provided in the preceding embodiments can be implemented through software programming. The software programs can be stored in accessible storage media, including the hard disk, compact disk, and floppy disk in a computer.

The preceding embodiments are exemplary embodiments of the present invention, which are not intended to confine the present invention. Any modifications, equivalent replacements, and improvements that are made within the idea and principles of the invention should be fall in the protection scope of the present invention.

What is claimed is:

1. A method for establishing a security mechanism for an air interface link, comprising:

deriving, by a mobility management entity, a shared key of an access link based on a root key and a Non-Access Stratum (NAS) count through a key derivation function (KDF), wherein the access link is an air interface link between a user equipment and a relay node, the relay node being communicated with an eNodeB through a relay link;

performing, by the mobility management entity, security processing on the shared key of the access link according to a key shared by the relay node and the mobility management entity;

sending, by the mobility management entity, over a network, the processed shared key of the access link to the relay node to enable the relay node to obtain the shared key of the access link based on the key shared by the relay node and the mobility management entity;

deriving, by the mobility management entity, a second temporary key different from the processed shared key and based on the shared key of the access link; and sending, by the mobility management entity, the second temporary key to the eNodeB to enable the eNodeB to derive a shared key of the relay link using the KDF function where the second temporary key and a physical cell identity (PCI) of a coverage cell of the relay node are parameters, and to send the shared key of the relay link to the relay node.

2. The method according to claim 1, further comprising:
obtaining an identifier of the relay node; and
obtaining the key shared by the relay node and the mobility management entity based on the identifier of the relay node.

3. The method according to claim 2, wherein the obtaining the identifier of the relay node comprises:

receiving a Non-Access Stratum (NAS) message sent by the relay node, wherein the NAS message carries the identifier of the relay node.

4. The method according to claim 1, wherein the key shared by the relay node and the mobility management entity is a NAS key or a root key corresponding to the relay node, or a network domain security protection key.

5. The method according to claim 2, wherein the identifier of the relay node and the key shared by the relay node and the mobility management entity are obtained by the mobility management entity.

6. The method according to claim 3, wherein the NAS message is received by the mobility management entity.

7. The method according to claim 2, wherein the obtaining the identifier of the relay node comprises receiving a radio resource control (RRC) message sent by the relay node or the eNodeB, wherein the RRC message carries the identifier of the relay node and the RRC message is a user authentication response message or an RRC connection complete message.

8. The method according to claim 7, wherein the RRC message is received by the mobility management entity.

9. The method according to claim 1, wherein the deriving, by the mobility management entity, the second temporary key different from the processed shared key and based on the shared key of the access link comprises deriving, by the mobility management entity, the second temporary key by using the root key and the shared key of the access link through the KDF.

10. A mobility management entity, comprising:

a processor, configured to derive a shared key of an access link through a key derivation function (KDF) based on a root key and a Non-Access Stratum (NAS) count, perform security processing on the shared key of the access link according to a key shared by a relay node and the mobility management entity, and derive a second temporary key based on the shared key of the access link, wherein the access link is an air interface link between a user equipment and the relay node, the relay node being communicated with an eNodeB through a relay link; and a sender, configured to send the processed shared key of the access link obtained from the processor to the relay node to enable the relay node to obtain the shared key of the access link based on the key shared by the relay node and the mobility management entity, and send the second temporary key to the eNodeB to enable the eNodeB to derive a shared key of the relay link using the KDF function where the second temporary key and a physical cell identity (PCI) of a coverage cell of the relay node are parameters, and to send the shared key of the relay link to the relay node, wherein the processed shared key is different from the second temporary key.

11. The mobility management entity according to claim 10, the processor further configured to obtain an identifier of the relay node, and to obtain the key shared by the relay node and the mobility management entity based on the identifier of the relay node.

12. The mobility management entity according to claim 10, wherein the processor is further configured to derive the second temporary key by using the root key and the shared key of the access link through the KDF.

* * * * *